United States Patent

[11] 3,586,269

| [72] | Inventor | Eugene Hensley<br>Skyland, N.C. |
|---|---|---|
| [21] | Appl. No. | 857,917 |
| [22] | Filed | Sept. 15, 1969 |
| [45] | Patented | June 22, 1971 |
| [73] | Assignee | Stencel Aero Engineering Corporation<br>Arden, N.C. |

[54] MEANS FOR REEFING A PILOT PARACHUTE
6 Claims, 3 Drawing Figs.

[52] U.S. Cl. .................................................. 244/152
[51] Int. Cl. ................................................. B64d 17/36
[50] Field of Search ........................................... 244/152,
149, 147, 142, 122

[56] References Cited
UNITED STATES PATENTS

| 2,517,488 | 8/1950 | Horning | 244/152 |
| 2,721,716 | 10/1955 | Beadle | 244/152 X |
| 3,334,847 | 8/1967 | Axenborg | 244/122 |
| 3,389,880 | 6/1968 | Ferguson | 244/152 X |

FOREIGN PATENTS

| 1,139,390 | 11/1962 | Germany | 244/152 |

*Primary Examiner*—Milton Buchler
*Assistant Examiner*—James E. Pittinger
*Attorney*—Roylance, Abrams, Kruger, Berdo & Kaul ABSTRACT: First and second members are initially connected together by a frangible means. The first member connects to the pilot parachute suspension lines and the second member, which attaches to a load, connects to control line means. The control line means are connected with a closed loop attached at the periphery of the pilot parachute canopy and are initially slack. When the aerodynamic forces on the canopy cause the first and second members to move relatively to one another, thereby breaking the frangible means, the control line means are pulled taut thus exerting a force on the closed loop which, in turn, reefs the canopy.

FIG. I

INVENTOR
EUGENE HENSLEY

INVENTOR
EUGENE HENSLEY

MEANS FOR REEFING A PILOT PARACHUTE

This invention relates to parachute systems or escape systems and more particularly it relates to the use of a pilot parachute as part of such a system and a means for reefing such a pilot parachute.

Pilot parachutes are commonly used as a means for deploying and stabilizing a main parachute which, in turn, is attached to some load to be aerially lowered. In the usual instance, the pilot parachute is deployed into the airstream where it is inflated aerodynamically, and the aerodynamic drag forces which act on the inflated pilot parachute canopy cause a pull to be transmitted through the pilot parachute lines and back to the connection point or anchor point for such lines. This pull can be used, for example, to deploy a main parachute out of its pack and into the airstream in an oriented downstream manner or it can be used to deploy some other object, such as a rocket, which assists in the downstream deployment of the main parachute.

In any event, it has been found that no single canopy configuration for a pilot parachute can be entirely satisfactory due to the fact that the airspeeds and hence the drag forces on the pilot canopy can vary greatly. That is, if the deployment of the pilot canopy is effected at relatively low airspeeds, the drag forces exerted thereby will be of a particular value. However, if the same pilot parachute is deployed at considerably higher airspeeds, the drag forces exerted by the canopy will be considerably higher.

In an effort to compensate for these varying airspeeds and drag forces, there has been an attempt made to design a pilot canopy with some compromise configuration which is most effective at medium airspeeds but which is not sufficiently effective at low airspeeds and which may exert too great a force at high airspeeds, resulting either in intolerable stabilizing forces or in excessive inertial forces when the main parachute canopy is snubbed at full stretch of its suspension lines. Another proposal which is more satisfactory is to simply use two pilot canopies, namely, a high-speed canopy and a low-speed canopy. The low-speed canopy is ordinarily deployed first and if the airspeed is too great and the drag forces reach some preselected value, then the high-speed canopy is deployed. A two canopy arrangement such as this does accomplish the desired goal of providing aerodynamic forces from the pilot parachute which are in some manner correlated with the airspeed, but it is naturally somewhat unsatisfactory to have to provide two separate canopies because of weight considerations and because of cost considerations.

With the foregoing in mind, it is, therefore, an object of the present invention to overcome the difficulties and deficiencies associated with the prior art and to provide instead, a new improved pilot parachute whose canopy configuration can be varied and is varied in response to airspeed and aerodynamic force variations.

Another object of the present invention is to provide simple and efficient means for reefing the canopy of a pilot parachute in response to preselected and predetermined conditions.

Another object of the present invention is to provide a pilot parachute and reefing means therefor wherein a single pilot chute canopy is effective, regardless of the airspeed and aerodynamic force acting thereon.

Another object of the present invention is to provide a simplified means for varying the canopy configuration of a pilot parachute canopy.

Other objects, advantages and salient features of the present invention will become apparent from the following detailed description, which, taken in conjunction with the annexed drawings, discloses a preferred embodiment thereof.

Referring now to the drawings.

Figure 1:
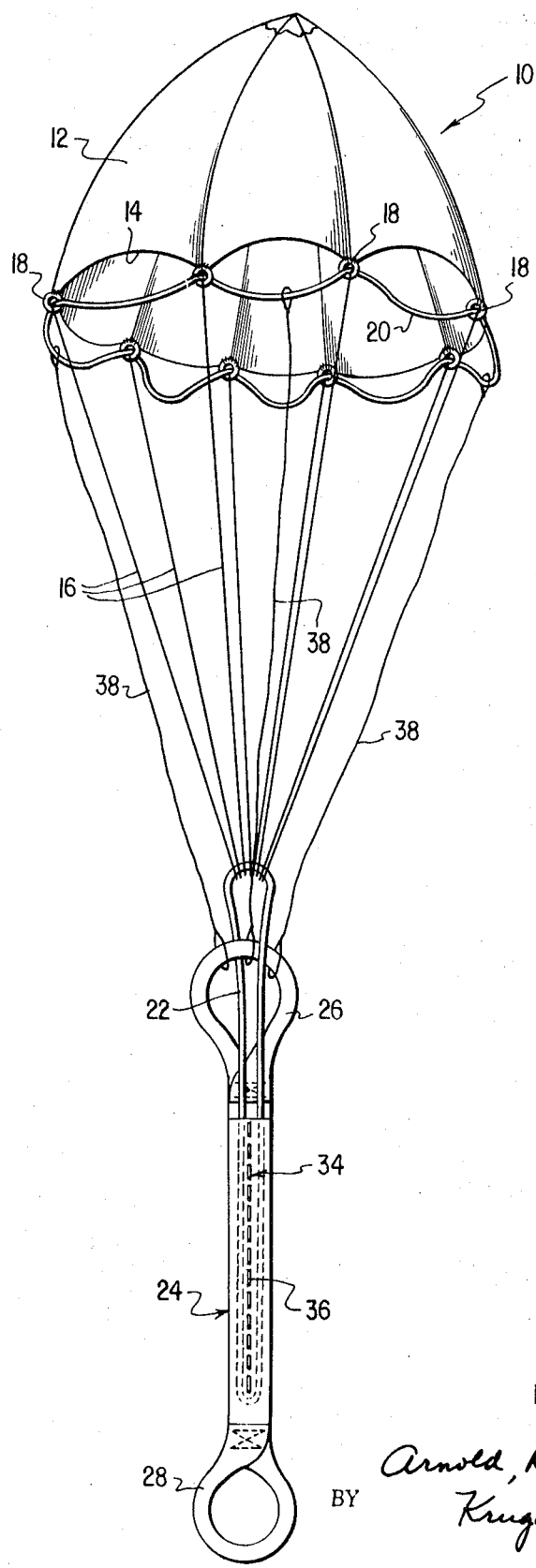
FIG. 1 is a diagrammatic view of means in accordance with the principles of the present invention, the pilot canopy being illustrated in unreefed condition.

Referring now to the drawings in further detail, there is shown in FIG. 1 a pilot parachute generally designated 10 which includes a canopy 12 whose skirt terminates in an edge or periphery 14 and a series of suspension lines 16. The canopy 12 can be of conventional construction and configuration.

Attached to the periphery of the canopy 12 are a series of rings 18 and a flexible closed loop member 20 is trained through these rings. The circumference of the closed loop 20 is somewhat larger than the circumference of the canopy periphery 14, and as a result, the loop 20 hangs slightly as it spans between each pair of supporting rings 18.

Figure 3:
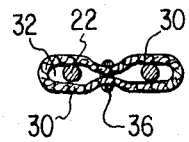
FIG. 3 is a sectional view taken along the line 3-3 of FIG. 2.

The pilot parachute suspension lines 16 are trained about and hence connected with a first member 22 which is an elongated endless loop of cord, cable or the like. A second member generally designated 24 is also provided, such second member including loops or eyes 26 and 28 at the opposite ends thereof. Preferably, the second member 24 is formed of tubular webbing, although it can be formed of an individual pair of webs stitched together along their edges to form a hollow central portion. As shown best in FIG. 3, the pair of webs 30, 30 are integrally connected at their edges in the form of a tubular sheath which defines therewithin a central cavity 32. Alternatively, the two webs 30, 30 could be individual flat webs stitched together at their side edges or could be one large flat web folded in half and stitched together along one side edge, and in either such event, the central cavity 32 would still be formed.

At least a portion of the first member 22 is disposed within the hollow cavity 32 in the manner shown in the drawings. Although the member 22, as illustrated, is one large endless loop, it would also be possible to provide a smaller loop portion to fit only within the cavity 32 and to provide a projecting end from this smaller loop portion for attachment with the suspension lines 16. In either event, it is important that the loop portion, or at least a portion thereof, be disposed in the cavity 32 of the first member. This loop or this loop portion is maintained in position within the cavity, at least initially, by a frangible means 34, which, in this preferred embodiment, consists of a row of breakable stitches 36 disposed within the loop 22 and connecting the webs 30, 30 together in the manner shown best in FIG. 3. So long as such stitches 36 remain intact and unbroken, they keep the loop 22 positioned within the cavity 32 and they hence connect the first member 22 and the second member 24 with each other.

The loop 26 at the downstream end of the second member 24 is connected with the closed loop 20 mounted adjacent the canopy periphery by control line means 38. This control line means includes at least one, and preferably several individual lines 38 connected at one end to the loop 26 and at their other end to the loop 20. When the first and second members 22 and 34 are initially connected with one another, the loop 22 is disposed within the cavity 32 a sufficient distance to make certain that the control lines 38 remain slack even when the suspension lines 16 reach full stretch.

The loop 28 at the upstream end of the second member 24 is adapted for connection, either directly or indirectly, with the load to be aerially lowered by parachute. That is, the loop 28 can be connected through a towline to a main canopy to extract the same from its parachute pack and to deploy the same into the airstream in a downstream direction. Alternatively, the loop 28 can be attached to a rocket or the like which is deployed into the airstream and which, in turn, deploys the main canopy. In any event, it is apparent that the combination illustrated can be attached to any form of main parachute deployment arrangement and can be used as a part of any type of escape system with the attachment to such combination being made at the loop or eye 28.

Assuming that the combination thus far described is placed in use and the pilot canopy 12 is deployed into the airstream, such canopy will be inflated aerodynamically thus pulling taut the suspension lines 16 and exerting a pull along the member 22, which pull is transferred to the member 24 and hence to the eye 28 at the upstream end thereof. As aforesaid, this eye is attached either directly or indirectly to the load, generally through the main parachute canopy, and the aerodynamic forces acting on the pilot parachute will thus ordinarily deploy the main canopy into the airstream in a downstream direction.

Figure 2:
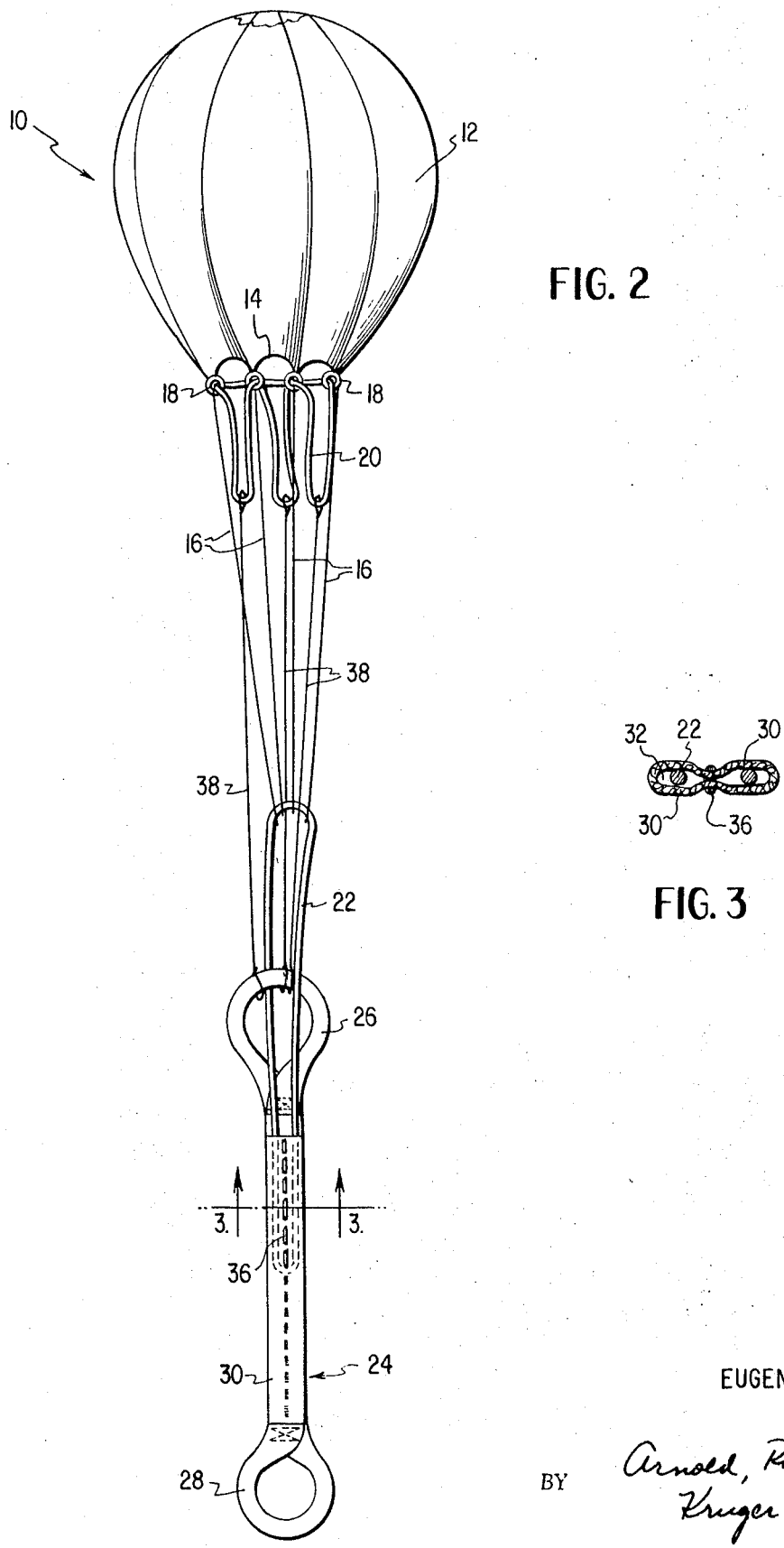
FIG. 2 is a diagrammatic view similar to FIG. 1 but with the pilot canopy shown in reefed condition.

However, when the aerodynamic drag forces reach a certain value or exceed a predetermined amount, which would ordinarily be occasioned by higher airspeeds, these drag forces will be transmitted through the suspension lines to the first member 22 which will pull against the frangible means 36 until it breaks. The frangible means 36, which in the illustrated embodiment consists of a line of stitches, can have all stitches in the line of the same value or break strength, or alternatively, can be of progressively increasing or decreasing break strength. In either event, when the pull on the member 22 exceeds the break strength, the stitches 36 will start to break as shown in FIG. 2. In FIG. 2, the pull on the loop 22 has been such that a certain number of the stitches 36 have been broken, and as soon as the stitches or frangible means starts to break, the first member 22 and the second member 24 start to move relatively to one another. This relative movement causes the control lines 38 to pull taut and to in turn exert a pull upon the closed loop 20. As the loop 20 is pulled in an upstream direction after full stretch of the control lines 38, such pulling on the loop tends to close the "mouth" or periphery of the canopy 12. This closing or reefing action thus reduces the aerodynamic drag forces by the expedient of reducing the air inlet to the canopy 12.

It can thus be seen and understood that the configuration of the pilot canopy 12 is automatically varied in accordance with the airstream condition and the reefing action is more or less automatically accomplished. Thus, if the airspeed and aerodynamic forces only slightly exceed the preselected initial value, only a slight pull will be exerted on the loop 22 and perhaps one or two of the frangible stitches 36 will be broken. This will create a slight relative separation of the first member 22 and the second member 24 and will in turn cause the control lines 38 to exert a slight pull on the closed loop 20 which, in turn, will close or reef the pilot canopy 12 slightly. As soon as this slight reefing action has occurred, the aerodynamic forces will be reduced and the loop 22 will not break any more of the frangible stitches. On the other hand, if pilot parachute deployment occurs at a somewhat higher airspeed, then the aerodynamic forces on the pilot canopy will be considerably greater and the loop 22 will separate relatively to the second member 24 for a somewhat greater distance, thereby breaking considerably more of the frangible stitches 36. This greater relative separation will naturally cause a greater pull by the control lines on the loop 20 and will cause a greater closing or reefing of the pilot canopy 12, in the manner shown in FIG. 2. However, even in this instance, once the canopy has been reefed a sufficient amount, the aerodynamic drag forces will be reduced sufficiently so that the loop 22 will stop breaking the stitches 36.

It should be understood, of course, that the frangible means 34 of the present invention need not be limited to the row of stitches 36 as illustrated in the drawings hereof. If stitches are used, the strength of the stitches can be progressively increased or decreased, if desired, the stitch pattern can be varied if desired, and the material from which the stitches are formed can be varied, if desired. Moreover, it is not even necessary that the frangible means be stitches since there are many other suitable forms of breakable arrangements such as pins, staples and so on which could work. As still another possibility, the loop 22 could carry a pin or other projection which extends through a hole or slot in the second member 24 so that relative separation of the first and second members could be accomplished by the pin tearing along the second member to enlarge its groove or slot.

After reading the foregoing detailed description, it should be apparent that the objects set forth at the outset of the specification have been successfully achieved by the present invention. Accordingly

What I claim is:

1. Means for reefing a pilot parachute comprising:
   a first member connected with the suspension lines of the pilot parachute;
   a closed loop attached to the canopy of the pilot parachute along the periphery thereof;
   a second member adapted for connecting the pilot parachute to a load;
   control line means connected between said closed loop and said second member; and
   frangible means initially connecting said first member and said second member together in a manner wherein said control line means are maintained slack;
   said frangible means being breakable when aerodynamic forces acting on said pilot parachute canopy cause said first and second members to move relatively to each other;
   said relative movement of said first and second members causing said control line means to pull taut and to exert a force on said closed loop which, in turn, reefs saID pilot parachute canopy.

2. Means as defined in claim 1 wherein said second member includes a pair of spaced webs and wherein said first member is initially at least partially interposed between said webs.

3. Means as defined in claim 2 wherein said frangible means connects said pair of webs and thus maintains said first and second members connected.

4. Means as defined in claim 3 wherein said first member includes an elongated endless loop interposed between said pair of webs and wherein said frangible means is disposed with said endless loop whereby, when aerodynamic forces move said endless loop, at least a portion thereof is brought into contact with said frangible means.

5. Means as defined in claim 4 wherein said frangible means consist of a row of stitches interconnecting said pair of webs.

6. Means as defined in claim 1 wherein a series of rings are attached to said canopy along the periphery thereof and wherein closed loop passes through said rings.